United States Patent
Sugata

(10) Patent No.: US 7,917,118 B2
(45) Date of Patent: Mar. 29, 2011

(54) RECEIVER APPARATUS AND METHOD OF PROCESSING RECEIVED SIGNAL WHICH ATTAIN OPTIMUM SNR

(75) Inventor: Akihiko Sugata, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1399 days.

(21) Appl. No.: 11/359,490

(22) Filed: Feb. 23, 2006

(65) Prior Publication Data
US 2006/0211396 A1     Sep. 21, 2006

(30) Foreign Application Priority Data
Mar. 15, 2005   (JP) .................. 2005-073982

(51) Int. Cl.
*H04B 1/00*     (2006.01)
*H04B 1/16*     (2006.01)
(52) U.S. Cl. ................. 455/307; 455/339; 375/350
(58) Field of Classification Search .............. 455/3.02, 455/130, 131, 150.1, 307, 313, 334, 339; 375/322, 346, 350
See application file for complete search history.

(56) References Cited

U.S. PATENT DOCUMENTS

| | | | |
|---|---|---|---|
| 5,134,707 A * | 7/1992 | Sakashita et al. ............ | 455/3.02 |
| 5,606,579 A | 2/1997 | Patel et al. | |
| 5,654,774 A * | 8/1997 | Pugel et al. ................ | 375/348 |
| 5,739,874 A | 4/1998 | Badger et al. | |
| 5,963,842 A * | 10/1999 | Kinugawa ................. | 455/339 |
| 6,112,070 A * | 8/2000 | Katsuyama et al. ......... | 455/307 |
| 6,904,108 B2 | 6/2005 | Hashimoto | |
| 7,512,392 B2 * | 3/2009 | Millard et al. ............... | 455/339 |

FOREIGN PATENT DOCUMENTS

| | | |
|---|---|---|
| CN | 1130838 A | 9/1996 |
| CN | 1190504 A | 8/1998 |
| JP | 7-030499 A | 1/1995 |
| JP | 8-164119 A | 6/1996 |
| JP | 11-055142 A | 2/1999 |
| JP | 2000-092021 A | 3/2000 |
| JP | 2001-196962 A | 7/2001 |
| JP | 2002-152071 A | 5/2002 |
| JP | 2004096763 A | 3/2004 |

\* cited by examiner

*Primary Examiner* — Quochien B Vuong
(74) *Attorney, Agent, or Firm* — Arent Fox LLP

(57) ABSTRACT

A receiver apparatus includes a band-pass filter having a variable frequency band coupled to a node for receiving a received signal including a plurality of channels to output at an output node thereof a limited-band signal made by limiting a frequency band of the received signal to a frequency band of a desired channel, a frequency conversion unit coupled to the output node of the band-pass filter to output at an output node thereof an intermediate frequency signal made by converting frequencies of the limited-band signal, and a control unit configured to adjust an intermediate frequency of the intermediate frequency signal by controlling the frequency conversion unit in response to at least one of a signal speed and a channel frequency interval of the received signal.

10 Claims, 11 Drawing Sheets

FIG.11

| CHANNEL INTERVAL | SR | IF | DIFFERENCE FROM 10 MHz | CODE C1 |
|---|---|---|---|---|
| 6 | 1.5 | 10.5 | 0.5 | 00000001 |
|   | 2.0 | 10.5 | 0.5 | 00000001 |
|   | 3.5 | 10.75 | 0.75 | 00000011 |
|   | 5.3 | 11.65 | 1.65 | 00001001 |
| 8 | 1.5 | 10 | 0 | 00000000 |
|   | 2.0 | 10 | 0 | 00000000 |
|   | 3.5 | 10 | 0 | 00000000 |
|   | 5.3 | 10.65 | 0.65 | 00000010 |
|   | 5.6 | 10.80 | 0.80 | 00000100 |
|   | 6.9 | 11.45 | 1.45 | 00001000 |

FIG.12

| CHANNEL No. | LOCAL FREQUENCY | CODE C2 |
|---|---|---|
| 18 | 496 | 0000010000 |
| 19 | 504 | 0000010010 |
| 20 | 512 | 0000011110 |

FIG.13

| CODE C3 | VCO VOLTAGE (V) | LOCAL FREQUENCY (MHz) |
|---|---|---|
| 0000000000 | 0 | 56.000 |
| 0000000001 | 0.10 | 56.025 |
| 0000000010 | 0.15 | 56.030 |
| ⋮ | ⋮ | ⋮ |
| 0111111111 | 3.05 | 850.000 |
| 1111111111 | 3.10 | 850.025 |

RECEIVER APPARATUS AND METHOD OF PROCESSING RECEIVED SIGNAL WHICH ATTAIN OPTIMUM SNR

CROSS-REFERENCE TO RELATED APPLICATIONS

The present application is based upon and claims the benefit of priority from the prior Japanese Patent Application No. 2005-073982 filed on Mar. 15, 2005, with the Japanese Patent Office, the entire contents of which are incorporated herein by reference.

BACKGROUND OF THE INVENTION

1. Field of the Invention

The present invention generally relates to receiver apparatuses and methods of processing received signals, and particularly relates to a receiver apparatus and method of processing a received signal with respect to a received signal including a plurality of channels.

2. Description of the Related Art

In recent years, the amount of digital information that is transmitted and received has been increasing in order to provide digital information having higher quality. As a method of transmitting a large amount of information efficiently, a QAM (quadrature amplitude modulation) method that transmits information by use of amplitude modulation and phase modulation is generally known.

For digital satellite broadcasting and the like, a QPSK (quadrature phase shift keying) is currently used that transmits and receives 4-value (2-bit) data per modulation by assigning four different phases to respective values. In the CATV system that is subjected to less disturbance, a QAM modulation/demodulation that modulates both amplitude and phase is used in order to achieve more efficient data transfer. The QAM modulation/demodulation represents information by assigning bits to both the amplitude changes and phase changes of a carrier wave, thereby achieving efficient data transfer with a limited band width.

Among such QAM modulation/demodulation, 64 QAM is mainly used at present, which transmits and receives 64-value information by use of 64 wave patterns having different amplitudes and phases. It is expected that, in the future, 256 QAM or 1024 QAM having further increased numbers of data values will be employed.

In order to achieve QAM modulation/demodulation using such a large number of data values, the transmission path, receiver, and the like are required to have a high SNR (signal-to-noise ratio). Accordingly, how to prevent the degradation of the SNR becomes a main issue when implementing a high-quality information transmission system.

FIG. 1 is a block diagram showing an example of the configuration of a related-art CATV receiver apparatus.

The CATV receiver apparatus of FIG. 1 includes a tuner unit 10 and a demodulation unit 20. The tuner unit 10 includes a band-pass filter 11, a first amplifier 12, a first mixer 13, a second amplifier 14, a third amplifier 15, a second mixer 16, a fourth amplifier 17, and VCOs (voltage controlled oscillators) 18 and 19. Further, external SAW filters (surface acoustic wave filters) 30 and 31 are provided. The demodulation unit 20 includes an A/D converter 21 and a demodulator 22.

The band-pass filter 11 passes only a range of effective CATV channels among the frequency components of the received signal. The first amplifier 12 situated at the next stage amplifies the output signal of the band-pass filter 11 to a desired level. The first mixer 13 multiplies the output signal of the first amplifier 12 by a local frequency generated by the VCO 18, thereby performing frequency conversion. With this provision, a selected channel (desired wave) is positioned such as to correspond to the center frequency of the SAW filter 30. The signal amplified by the second amplifier 14 is processed by the SAW filter 30, so that frequencies (interfering waves) other than the desired wave are suppressed.

The third amplifier 15 amplifies the signal in order to compensate for the signal loss caused by the SAW filter 30. The second mixer 16 multiplies the output signal of the third amplifier 15 by a local frequency generated by the VCO 19, thereby performing frequency conversion and generating a signal having an intermediate frequency (IF). This IF signal frequency is generally 36 MHz in Europe and 44 MHz in the United States. The SAW filter 31 is thus generally designed to have a center frequency corresponding to either one of these frequencies.

The desired wave converted into the IF signal is amplified by the fourth amplifier 17 for provision to the demodulation unit 20. In the demodulation unit 20, the A/D converter 21 performs A/D conversion with respect to the supplied signal so as to generate a digital signal. The demodulator 22 performs timing recovery, waveform equalization, discrimination processing, etc., with respect to the digital signal, thereby outputting a post-process signal.

The SNR of the received signal in the demodulation unit 20 varies depending on the IF signal frequency, the signal speed (symbol rate), and the sampling frequency of the A/D converter 21. In order to achieve an optimum SNR, therefore, there is a need to adjust the IF signal frequency, the signal speed (symbol rate), and the sampling frequency.

The signal speed (symbol rate) is determined according to the specification of the transmission-side system, and is not adjustable in the receiver side. The sampling frequency is specific to the A/D converter 21, and is basically a fixed value. In order to change the sampling frequency, there is a need to provide a special circuit configuration and oscillator for achieving such function, which is not desirable from a cost point of view.

The IF signal frequency is set such as to match the center frequency of the SAW filter 31, and cannot be variable. The SAW filter utilizes an acoustic wave that propagates as vibration energy concentrates on the surface of piezoelectric crystal, thereby allowing a signal having specific frequency to pass therethrough. This specific frequency cannot be made variable.

Accordingly, the configuration of the related-art CATV receiver apparatus as shown in FIG. 1 has a problem in that an optimum SNR cannot be attained.

Patent Document 1 discloses a configuration in which the need for the SAW filters for selecting frequency is eliminated in the receiver apparatus.

[Patent Document 1] Japanese Patent Application Publication No. 2000-092021.

Accordingly, there is a need for a receiver apparatus which can optimize the SNR of the received signal.

SUMMARY OF THE INVENTION

It is a general object of the present invention to provide a receiver apparatus that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a receiver apparatus particularly pointed out in the specification in such full, clear, concise, and exact terms as to enable a person having ordinary skill in the art to practice the invention.

To achieve these and other advantages in accordance with the purpose of the invention, the invention provides a receiver apparatus which includes a band-pass filter having a variable frequency band coupled to a node for receiving a received signal including a plurality of channels to output at an output node thereof a limited-band signal made by limiting a frequency band of the received signal to a frequency band of a desired channel, a frequency conversion unit coupled to the output node of the band-pass filter to output at an output node thereof an intermediate frequency signal made by converting frequencies of the limited-band signal, and a control unit configured to adjust an intermediate frequency of the intermediate frequency signal by controlling the frequency conversion unit in response to at least one of a signal speed and a channel frequency interval of the received signal.

According to another aspect of the present invention, a method of processing a received signal includes the steps of producing a limited-band signal made by limiting, to a frequency band of a desired channel, a frequency band of a received signal inclusive of a plurality of channels, producing an intermediate frequency signal made by converting frequencies of the limited-band signal, producing a digital signal made by A/D-converting the intermediate frequency signal, applying digital filtering to the digital signal so as to limit a frequency band of the digital signal to the frequency band of the desired channel, and adjusting an intermediate frequency of the intermediate frequency signal in response to at least one of a signal speed and a channel frequency interval of the received signal.

According to at least one embodiment of the present invention, the intermediate frequency of the intermediate frequency signal is adjusted in response to at least one of the signal speed and channel frequency interval of the received signal, thereby attaining a desired intermediate frequency, which optimizes the SNR after A/D conversion. In so doing, the intermediate frequency signal is A/D-converted into a digital signal, which is then subjected to digital filtering such that its frequency band is limited to the frequency band of the desired channel. This achieves sufficient frequency selectivity with respect to the desired channel without use of a SAW filter.

With the optimization of the SNR of the received signal, the designing of a system and a demodulation unit becomes easier when implementing a high-quality information transmission system by use of multi-value transmission. Further, since the need for a SAW filter is eliminated, it is now possible to implement the tuner unit and the demodulation unit as a single chip, which contributes to cost reduction.

BRIEF DESCRIPTION OF THE DRAWINGS

Other objects and further features of the present invention will be apparent from the following detailed description when read in conjunction with the accompanying drawings, in which:

FIG. 11 is a drawing showing an example of a table in which control codes are defined in correspondence to a channel interval and signal speed;

FIG. 12 is a drawing showing a table that shows correspondence between each channel and local frequency; and FIG. 13 is a drawing showing relationships between the value of a control code to be written to a register of FIG. 10, a VCO voltage, and a local frequency.

DESCRIPTION OF THE PREFERRED EMBODIMENTS

In the following, embodiments of the present invention will be described with reference to the accompanying drawings.

Figure 1:
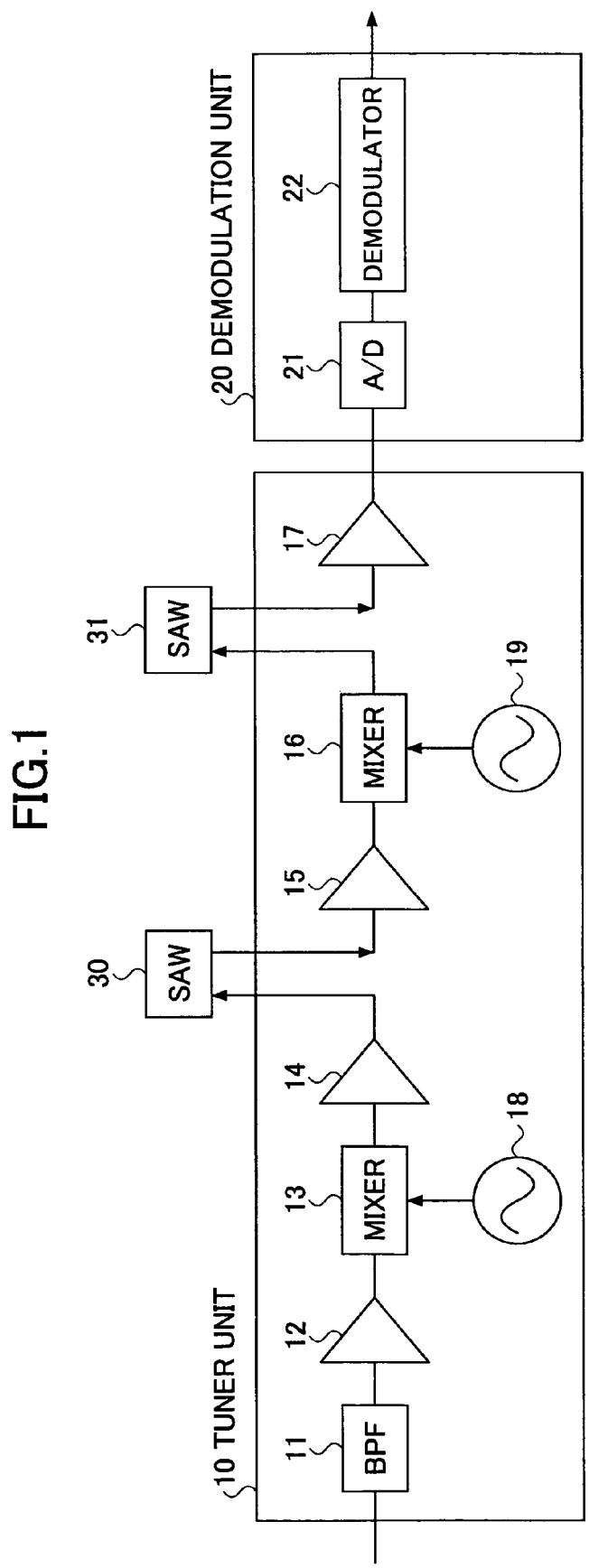
FIG. 1 is a block diagram showing an example of the configuration of a related-art CATV receiver apparatus.
Figure 2:
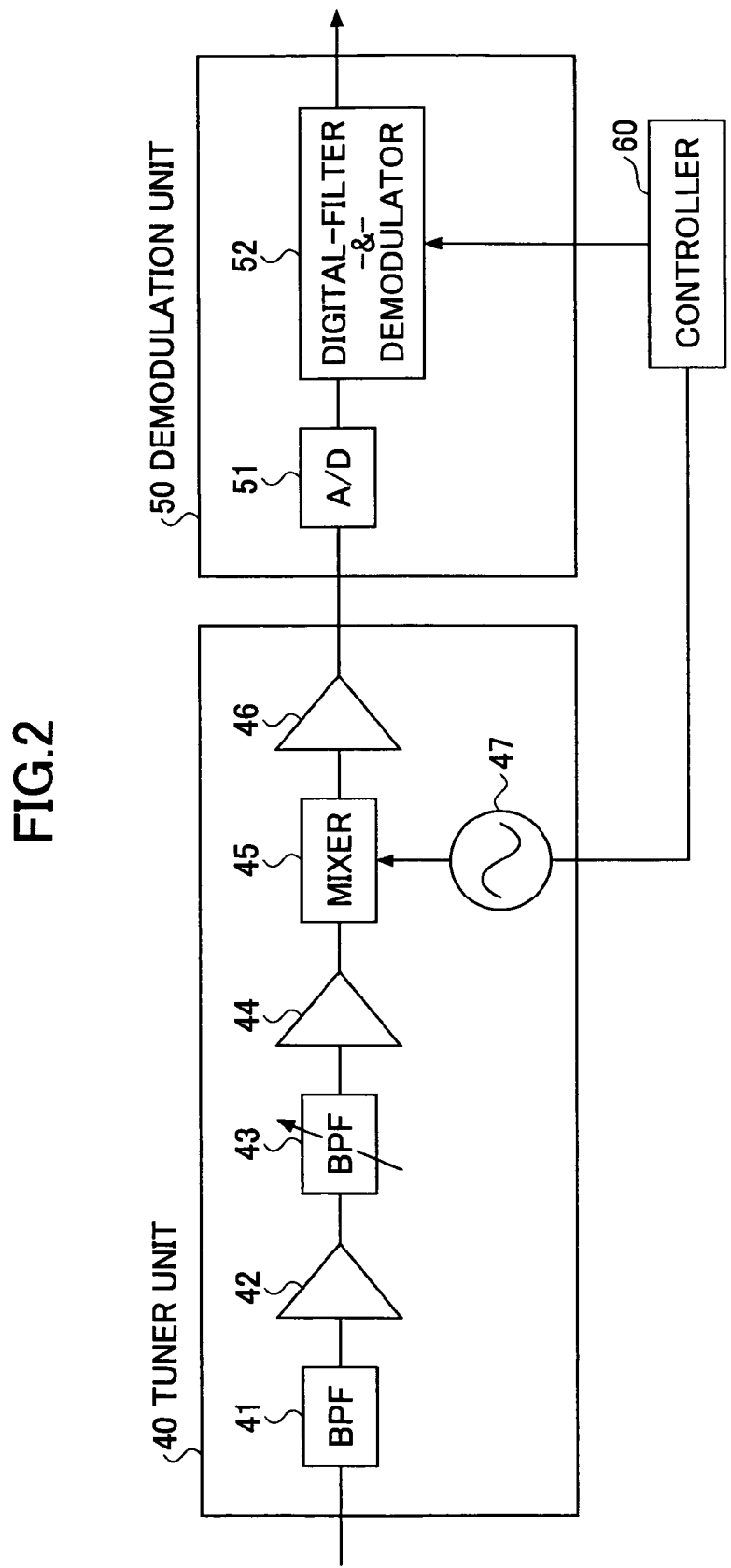
FIG. 2 is a block diagrams showing an example of the configuration of a CATV receiver apparatus according to the present invention.

FIG. 2 is a block diagrams showing an example of the configuration of a CATV receiver apparatus according to the present invention. Although the configuration of FIG. 2 is suitable for use as a CATV receiver apparatus, for example, the present invention is not limited to a CATV system and applicable to receiver apparatus in general.

The CATV receiver apparatus of FIG. 2 includes a tuner unit 40, a demodulation unit 50, and a controller 60. The tuner unit 40 includes a band-pass filter 41, a first amplifier 42, a band-pass filter 43, a second amplifier 44, a mixer 45, a third amplifier 46, and a VCO 47. The demodulation unit 50 includes an A/D converter 51 and a digital-filter-&-demodulator 52.

The band-pass filter 41 passes only a range of effective CATV channels among the frequency components of the received signal. Namely, the band-pass filter 41 passes the frequency components of the frequency band used in the CATV (50 MHz through 850 MHz), and suppresses other frequency components. The first amplifier 42 situated at the next stage is a low-noise amplifier, and amplifies the output signal of the band-pass filter 41 to a desired level.

The band-pass filter 43 has a variable frequency band, and selectively passes frequencies corresponding to a desired channel. Namely, the band-pass filter 43 has the function to pass only the frequency components around a desired channel while suppressing the frequency components corresponding to other channels. The band-pass filter 43 may be implemented in an IC chip, or may be provided as an external component separate from a chip. When the band-pass filter 43 is implemented as an LC filter, provision may be made to change the center frequency by providing variable capacitance C.

Since the received signal has a wide frequency band, a plurality of band-pass filters may be provided as the band-pass filter 43 so as to perform filtering with respect to respective frequency bands. The size of attenuation inside and outside the frequency band of the band-pass filter 43 is set such that the circuitry situated at the following stage such as the A/D converter 51 of the demodulation unit 50 does not saturate.

The second amplifier 44 amplifies the output of the band-pass filter 43 to a desired level. The gain of the second amplifier 44 is set by taking into account the loss at the band-pass filter 43 and the overall arrangement of gains in the tuner unit 40.

The mixer 45 multiplies the output signal of the second amplifier 44 by a local frequency generated by the VCO 47, thereby performing frequency conversion to generate an intermediate frequency (IF) signal. The VCO 47 is controlled by the controller 60. The local frequency generated by the VCO 47 is set to a frequency specified by the controller 60. A detailed description will be provided later regarding the setting of the local frequency.

In the mixer 45, frequency components corresponding to a sum and difference of the input signal frequency and the local frequency are generated. Unnecessary one of the frequency bands is suppressed by filtering. The third amplifier 46 amplifies the output of the mixer 45 so as to compensate for the loss caused by the mixer 45 and to attain a signal level that matches the demodulation unit 50.

In the demodulation unit 50, the A/D converter 51 converts the analog IF signal supplied from the tuner unit 40 into a digital signal. Since the frequency characteristics of the band-pass filter 43 have gentler slope (weaker frequency selectivity) than the frequency characteristics of a SAW filter, the output of the A/D converter 51 includes interfering waves in addition to the desired wave. The digital-filter-&-demodulator 52 first applies a narrow-frequency-band digital filter to suppress the interfering waves to extract the desired wave, and then applies demodulation processing such as timing recovery (carrier recovery), waveform equalization, and discriminating processing with respect to the extracted desired wave, thereby outputting a demodulated signal.

In the A/D converter 51 of the demodulation unit 50, with an aim of avoiding saturation upon receiving a signal including the desired wave and the interfering waves, AGC control needs to be performed as appropriate so as to set the signal level on the input side to a proper level. As described above, the digital-filter-&-demodulator 52 removes the interfering wave components by digital filtering, so that the number of bits of the output from the A/D converter 51 needs not only to be able to represent the desired wave properly with a desired SNR but also to be able to represent the entire signal inclusive of the interfering waves. If the desired wave needs to be represented in 8 bits, for example, and if the signal level becomes double the level of the desired wave due to mixing of the interfering waves, the number of bits of the output from the A/D converter 51 needs to be 9 bits.

The controller 60 supplies, to the digital-filter-&-demodulator 52, symbol rate information that is necessary for the digital-filter-&-demodulator 52 to perform demodulation. Further, with an aim of controlling the local frequency of the VCO 47 according to the symbol rate, channel intervals, and the like, the controller 60 supplies controls signals responsive to the symbol rate, channel intervals, and the like to the VCO 47. With this provision, the controller 60 controls the VCO 47 so as to attain a desired intermediate frequency, thereby optimizing the SNR after the A/D conversion. The parameters employed to control the local frequency for the purpose of attaining a desired intermediate frequency include a symbol rate (signal speed), channel intervals, and sampling frequency. In general, however, the sampling frequency is a fixed value specific to each device, so that the sampling frequency will not be referred to as one of the parameters in the following description unless there is a need to do so.

In the following, a description will be given of the control of an intermediate frequency for the purpose of optimizing an SNR.

Figure 3:
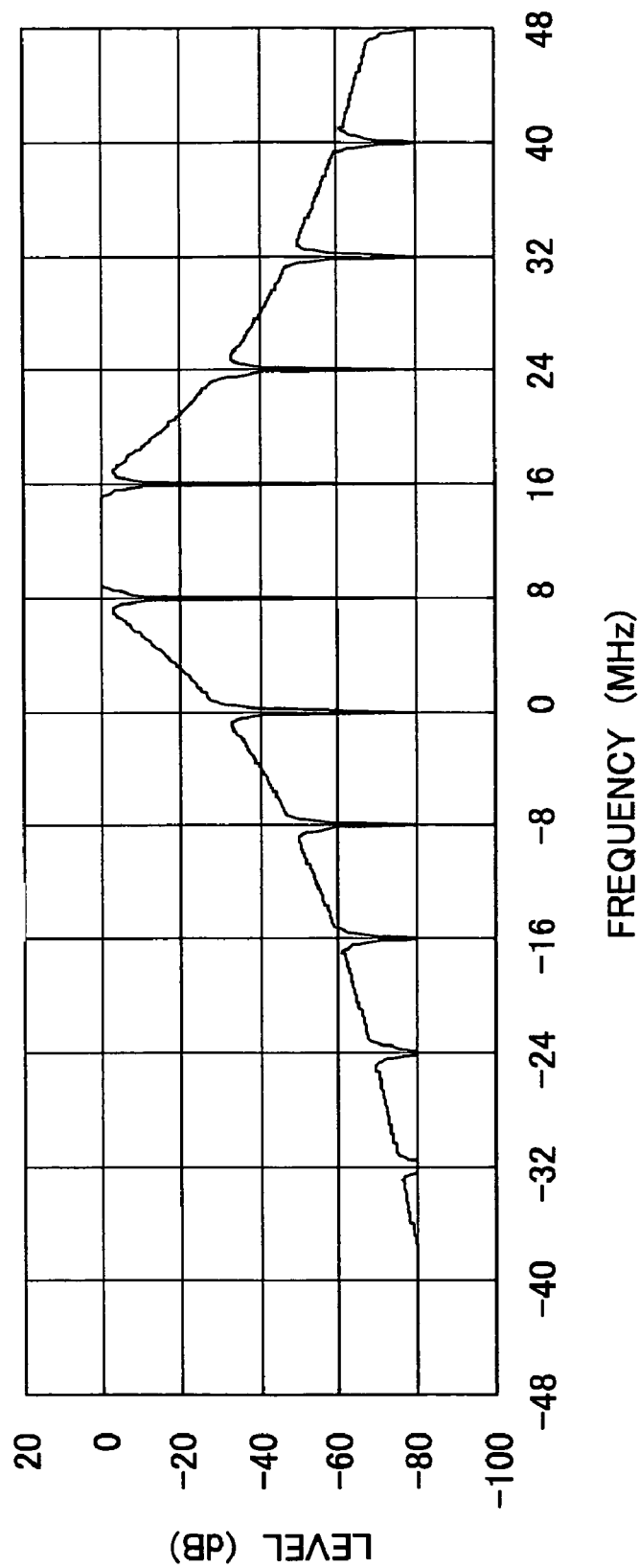
FIG. 3 is a drawing showing an example of the frequency spectrum of a signal that is input into an A/D converter of a demodulation unit.

FIG. 3 is a drawing showing an example of the frequency spectrum of a signal that is input into the A/D converter 51 of the demodulation unit 50. In respect of the frequency spectrum shown in FIG. 3, a desired wave (desired channel) and interfering waves (other channels) contained in the received signal have the same signal level at the point of input into the tuner unit 40, and the intervals of the channels are 8 MHZ, with the frequency of the IF signal being 12 MHz. Further, the band-pass filter 43 of the tuner unit 40 has a variable pass band of 10 Mz.

In FIG. 3, the frequency spectrum of the received signal is comprised of a plurality of bands spaced apart at 8-MHz intervals, which correspond to a plurality of channels. Each band is separated from one another. The IF signal frequency is set to 12 MHz, so that the spectrum has a peak at 12 MHz. As shown in FIG. 3, interfering wave components are still in existence on the either side of the spectrum of the desired wave components (12±3.5 MHz).

Figure 4:
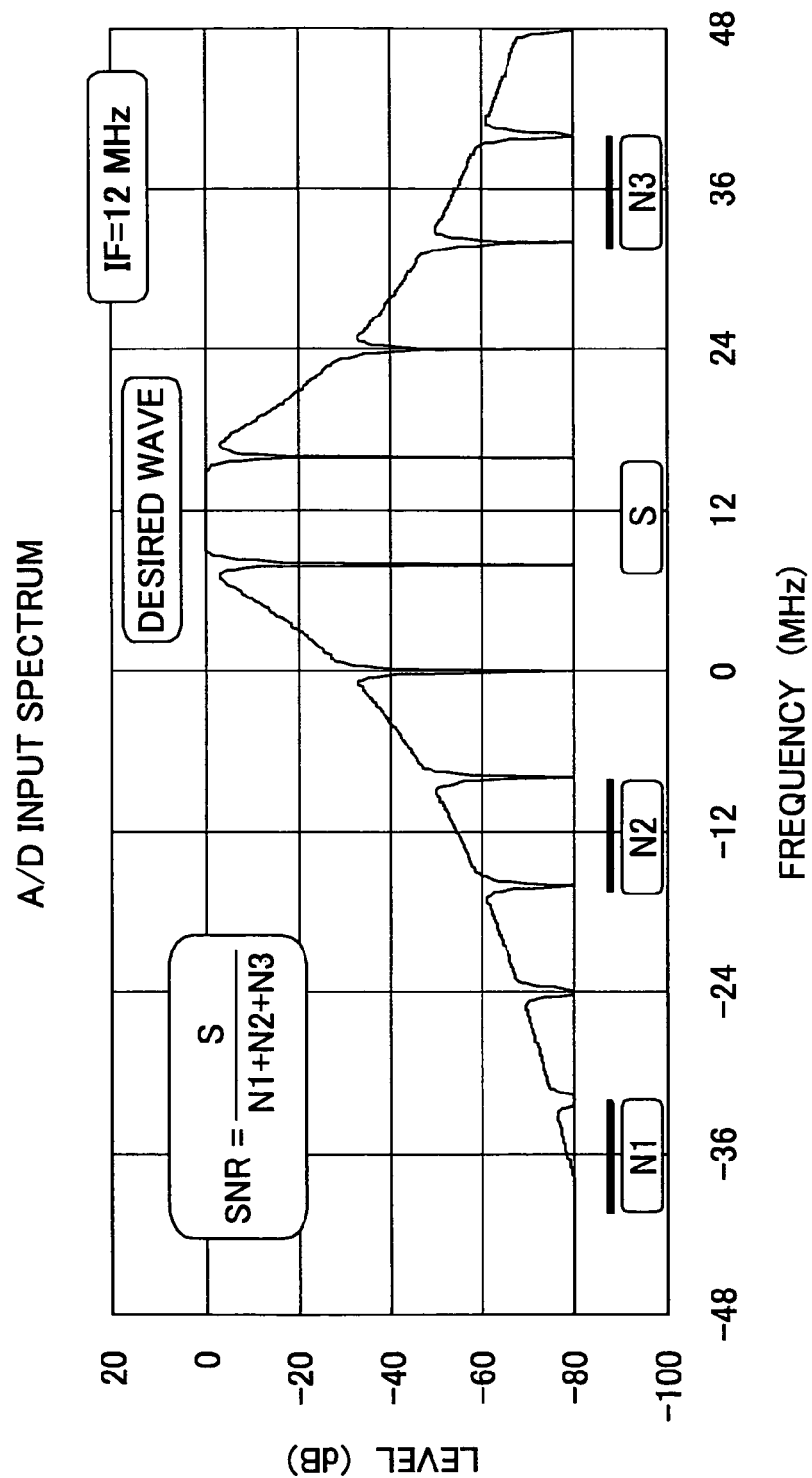
FIG. 4 is a drawing showing components that function as aliasing noise occurring due to sampling at the A/D converter.

FIG. 4 is a drawing showing components that function as aliasing noise occurring due to sampling at the A/D converter 51. FIG. 4 illustrates aliasing noise that is generated when the sampling frequency is 48 MHz, with the intervals of the channels being 8 MHz and the IF signal frequency being 12 MHz as in FIG. 3.

The desired wave band (12±3.5 MHz) is shown as an area S. When sampling is performed by using a sampling frequency fs of 48 MHz, aliasing noise is generated such that spectrums each identical to the spectrum shown in FIG. 4 are superimposed on one another at 48-MHz intervals. Areas (interfering areas) that overlap, as aliasing nose, the desired wave band area S shown in the spectrum of FIG. 4 are areas N1, N2, and N3 as shown in FIG. 4, which are ±4-MHz area centering at −fs+IF (−36 MHz), −IF (−12 MHz), and fs−IF (36 MHz). As a result, the SNR between the desired wave signal components and the aliasing noise components is represented as:

$$SNR = S/(N1+N2+N3). \quad (1)$$

Figure 5:
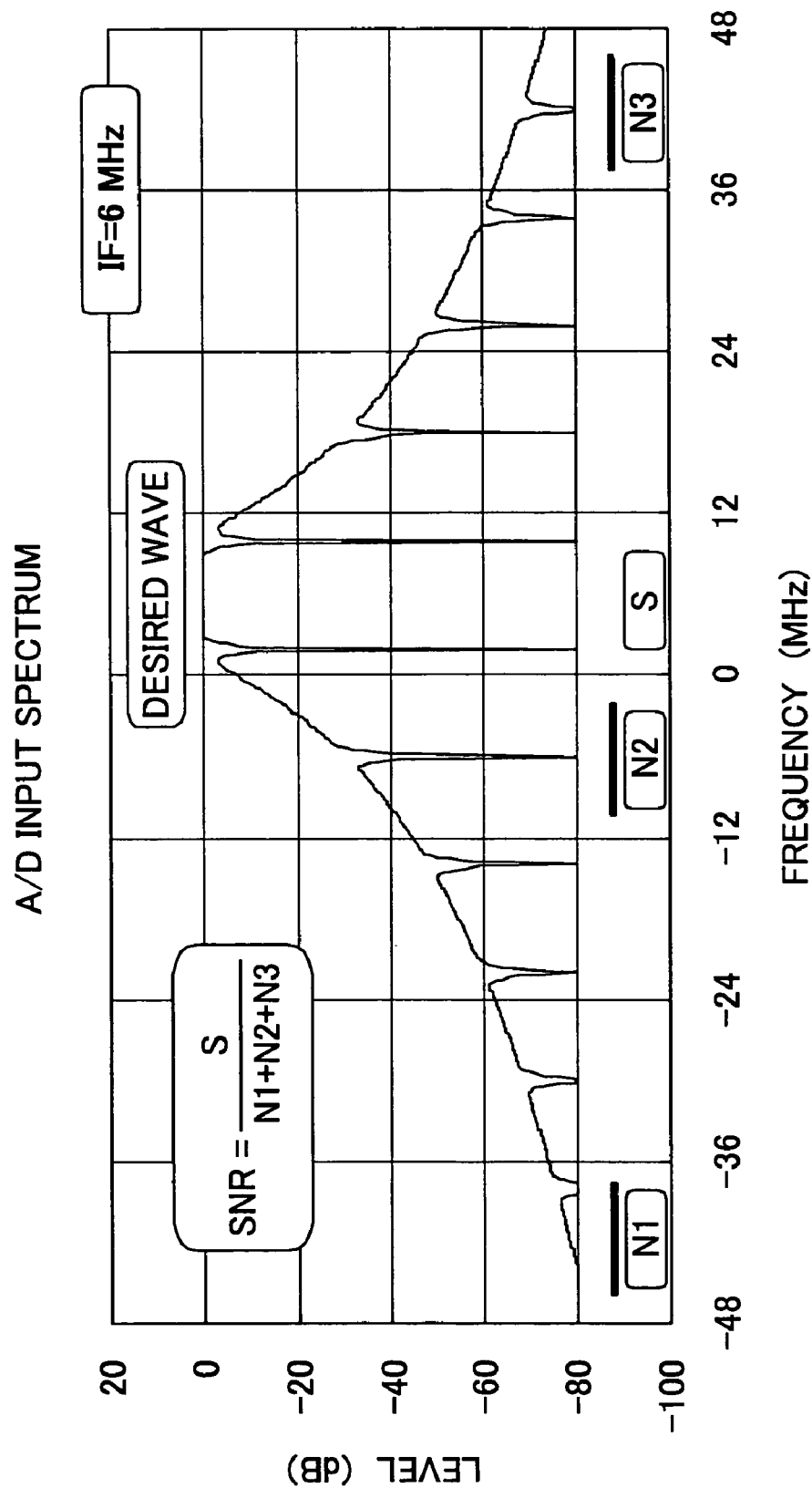
FIG. 5 is a drawing showing components that function as aliasing noise occurring due to sampling under different conditions.

FIG. 5 is a drawing showing components that function as aliasing noise occurring due to sampling under different conditions. FIG. 5 illustrates aliasing noise in a case in which the intervals of the channels are 8 MHz, and the sampling frequency is 48 MHz as in FIG. 4, with the IF signal frequency being differently set to 6 MHz.

The desired wave band (6±4 MHz) is shown as an area S. When sampling is performed by using a sampling frequency fs of 48 MHz, aliasing noise is generated such that spectrums each identical to the spectrum shown in FIG. 5 are superimposed on one another at 48-MHz intervals. Areas that overlap, as aliasing nose, the desired wave band area S shown in the spectrum of FIG. 5 are areas N1, N2, and N3 as shown in FIG. 5, which are ±4-MHz area centering at −fs+IF (−42 MHz), −IF (−6 MHz), and fs−IF (42 MHz). As a result, the SNR between the desired wave signal components and the aliasing noise components is represented by the expression (1) as in the case of FIG. 4.

The amount of aliasing noise will be compared between FIG. 4 and FIG. 5. The noise amount is the same with respect to the area N1. With respect to the area N2, the noise amount is larger in the case of IF=6 MHz. With respect to the area N3, the noise amount is larger in the case of IF=12 MHz. In this example, however, the area N2 in the case of IF=6 MHz is predominantly large, resulting in the overall SNR being better (larger SNR) for the case of IF=12 MHz.

Figure 6:
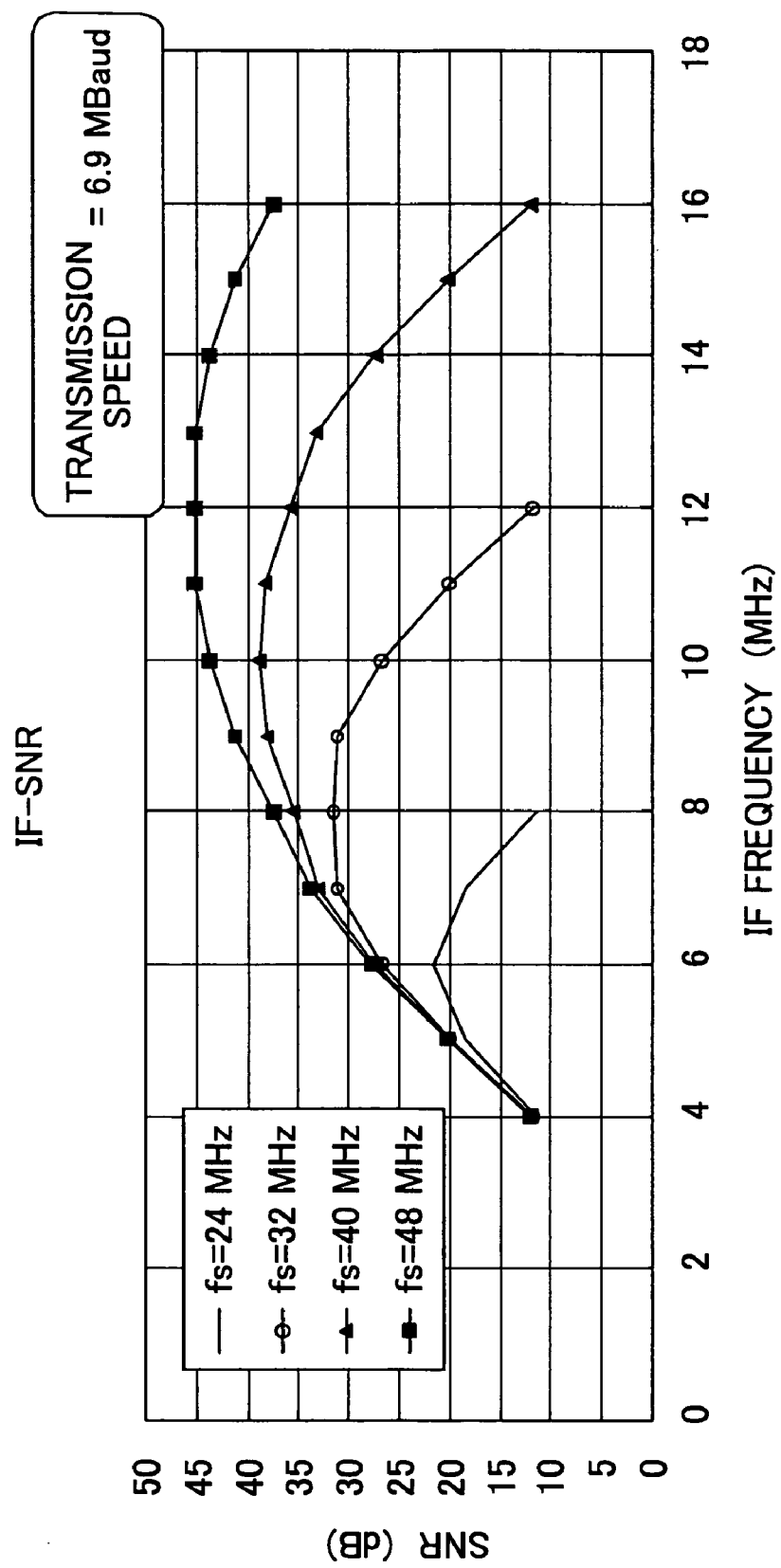
FIG. 6 is a drawing showing SNR characteristics versus IF frequencies with a sampling frequency serving as a parameter in the case of signal speed being 6.9 Mbaud.

FIG. 6 is a drawing showing SNR characteristics versus IF frequencies with the sampling frequency serving as a parameter in the case of the signal speed being 6.9 Mbaud.

As shown in FIG. 6, when the signal speed is close to the channel interval, the SNR versus the IF frequency exhibits a characteristics curve having a peak in the middle, with such peak being situated at ¼ of the sampling frequency fs. Namely, when the sampling frequency is 48 MHz, the peak is located at 12 MHz. When the sampling frequency is 40 MHz, the peak is located at 10 MHz. When the sampling frequency is 32 MHz, the peak is located at 8 MHz. When the sampling frequency is 24 MHz, the peak is located at 6 MHz.

With respect to a spectrum after passing through a narrow-band band-pass filter, frequency components close to the center frequency of the desired wave cannot be disregarded, but frequency components far away from the center frequency of the desired wave can be disregarded. Accordingly, it is desirable that the areas serving as aliasing noise are situated as far away as possible from the center frequency of the desired wave. Specifically, with the center frequency of the desired wave being set as a reference position, a frequency distance from the center frequency of the first aliasing noise area N2 on the negative side should be equal to a frequency distance from the center frequency of the first aliasing noise area N3 on the positive side in order for the amount of aliasing noise to be minimum.

Namely, with the IF signal frequency represented as IF, the sampling frequency of the A/D converter represented as fs, the center frequency of the first aliasing noise area on the negative side represented as A, and the center frequency of the first aliasing noise area on the positive side represented as B, the following equation needs to be satisfied.

$$IF - A = B - IF$$

Since A=−IF and B=fs−IF, the following equation is obtained.

$$IF = fs/4 \quad (2)$$

Figure 7:
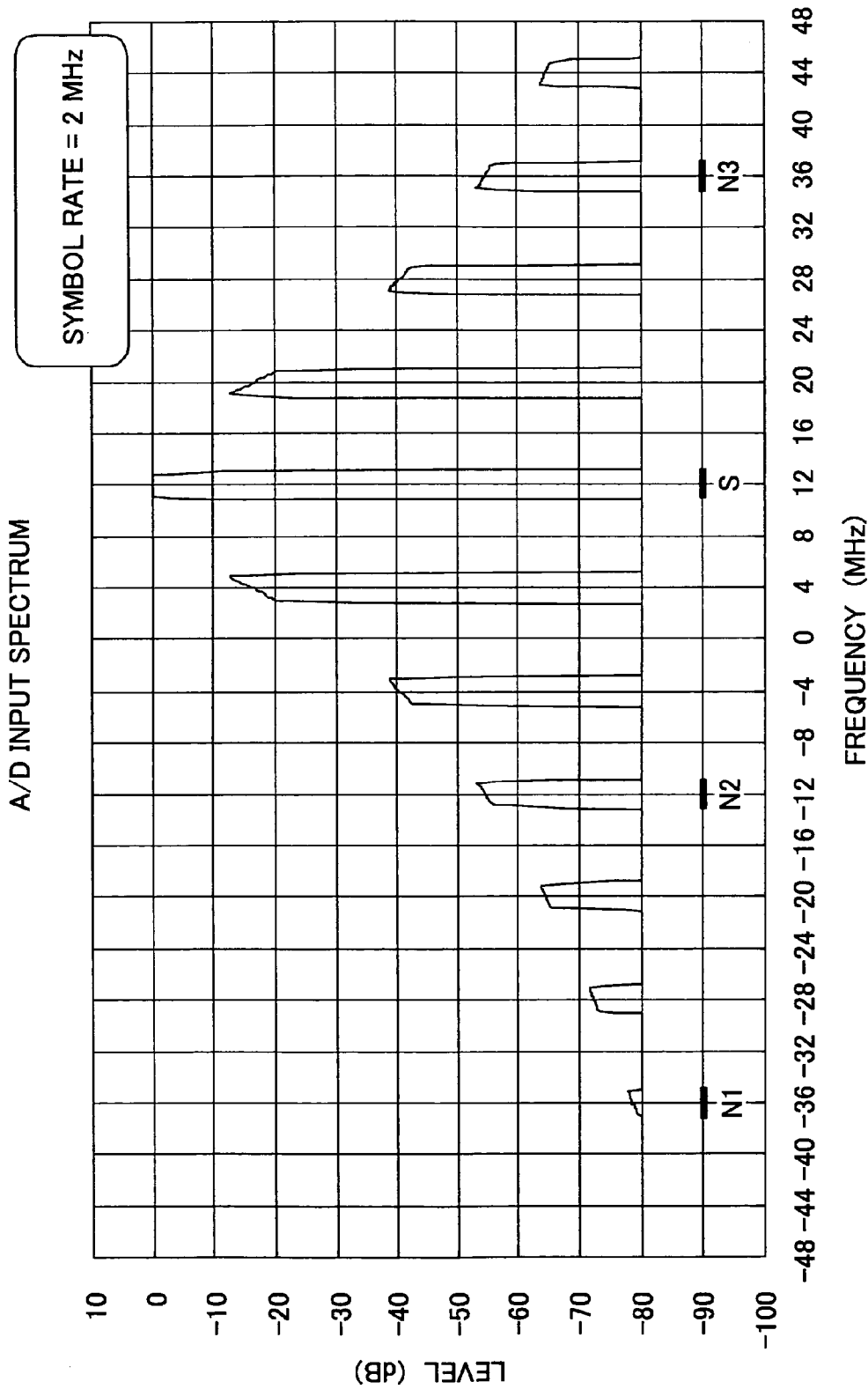
FIG. 7 is a drawing showing components that function as aliasing noise occurring due to sampling when the signal speed is 2 Mbaud.

FIG. 7 is a drawing showing components that function as aliasing noise occurring due to sampling when the signal speed is 2 Mbaud. FIG. 7 illustrates a case in which, as in FIG. 4, the intervals of the channels are 8 MHz, and the sampling frequency is 48 MHz, with the IF signal frequency being 12 MHz. In FIG. 4, the signal speed was 6.9 Mbaud. In contrast, the signal speed in FIG. 7 is 2 Mbaud, so that the frequency band of each channel is narrowly concentrated.

In FIG. 7, areas that overlap the desired wave band area S (with its center frequency at 12 MHz) as aliasing nose are areas N1, N2, and N3, which are areas centering at −fs+IF (−36 MHz), −IF (−12 MHz), and fs−IF (36 MHz). As a result, the SNR between the desired wave signal components and the aliasing noise components is represented by the expression (1) as in the case of FIG. 4.

Figure 8:
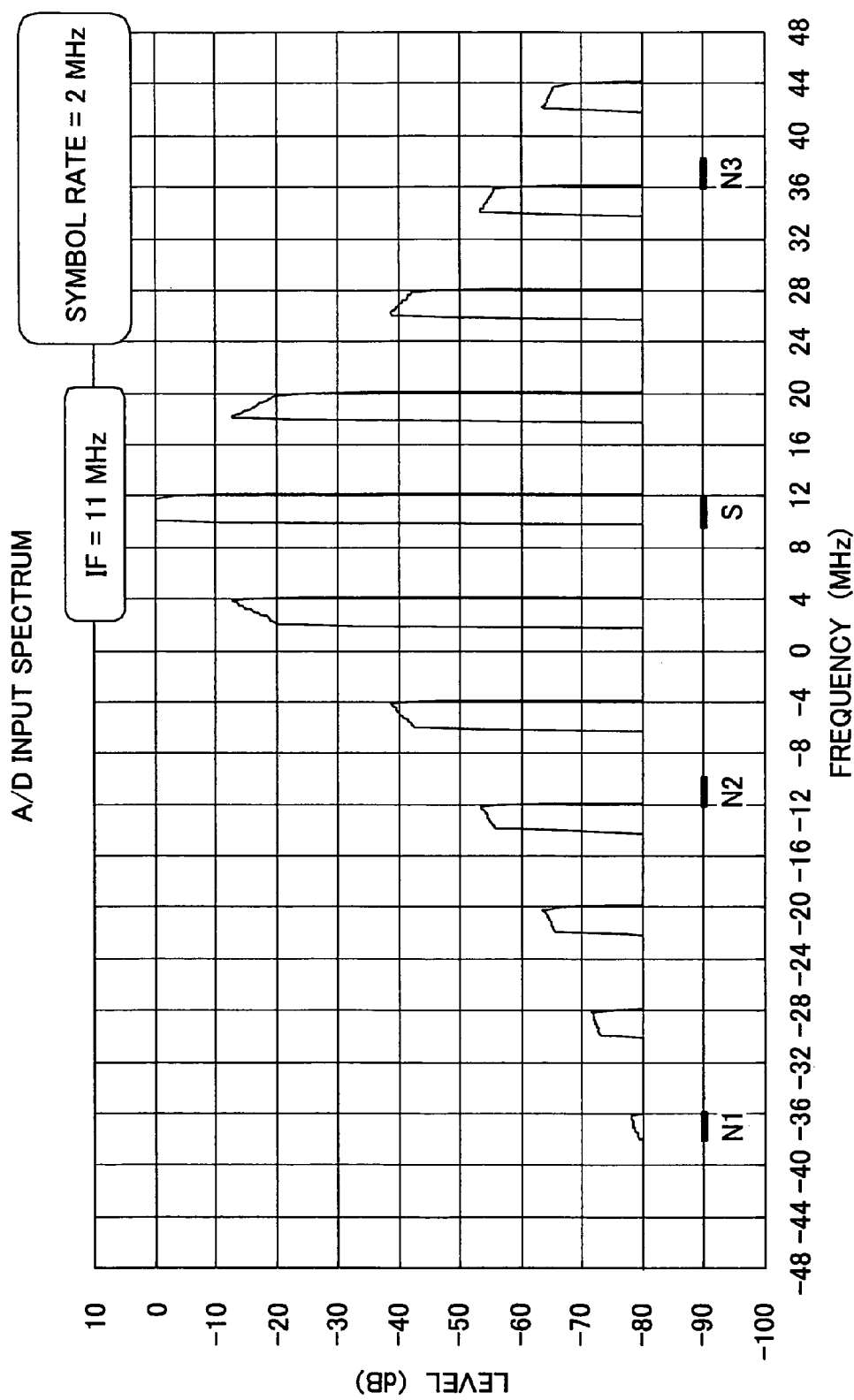
FIG. 8 is a drawing showing components that function as aliasing noise occurring due to sampling under different conditions.

FIG. 8 is a drawing showing components that function as aliasing noise occurring due to sampling under different conditions. FIG. 8 illustrates a case in which, as in FIG. 7, the intervals of the channels are 8 MHz, and the sampling frequency is 48 MHz, with the signal speed being 2 Mbaud. In FIG. 7, the IF signal frequency was 12 MHz. In contrast, the IF signal frequency in FIG. 8 is set to 11 MHz.

In FIG. 8, areas that overlap the desired wave band area S (with its center frequency at 11 MHz) as aliasing nose are areas N1, N2, and N3, which are areas centering at −fs+IF (−37 MHz), −IF (−11 MHz), and fs−IF (37 MHz). As a result, the SNR between the desired wave signal components and the aliasing noise components is represented by the expression (1) as in the case of FIG. 4.

Since the interval of the channels is 8 MHz in both FIG. 7 and FIG. 8, no signal components is present in 6-MHz areas that are defined by subtracting the signal speed from the channel interval. Under the conditions shown in FIG. 7, the aliasing noise areas N1 through N3 precisely overlap the positions where the signal components are in existence. In contrast, under the conditions shown in FIG. 8, the predominant areas N2 and N3 serving as aliasing noise correspond to the positions where no signal components are present. With IF being set such that signal components are not present in the areas N1 through N3 serving as aliasing noise as in the case of FIG. 8, it is possible to maximize the SNR.

Figure 9:
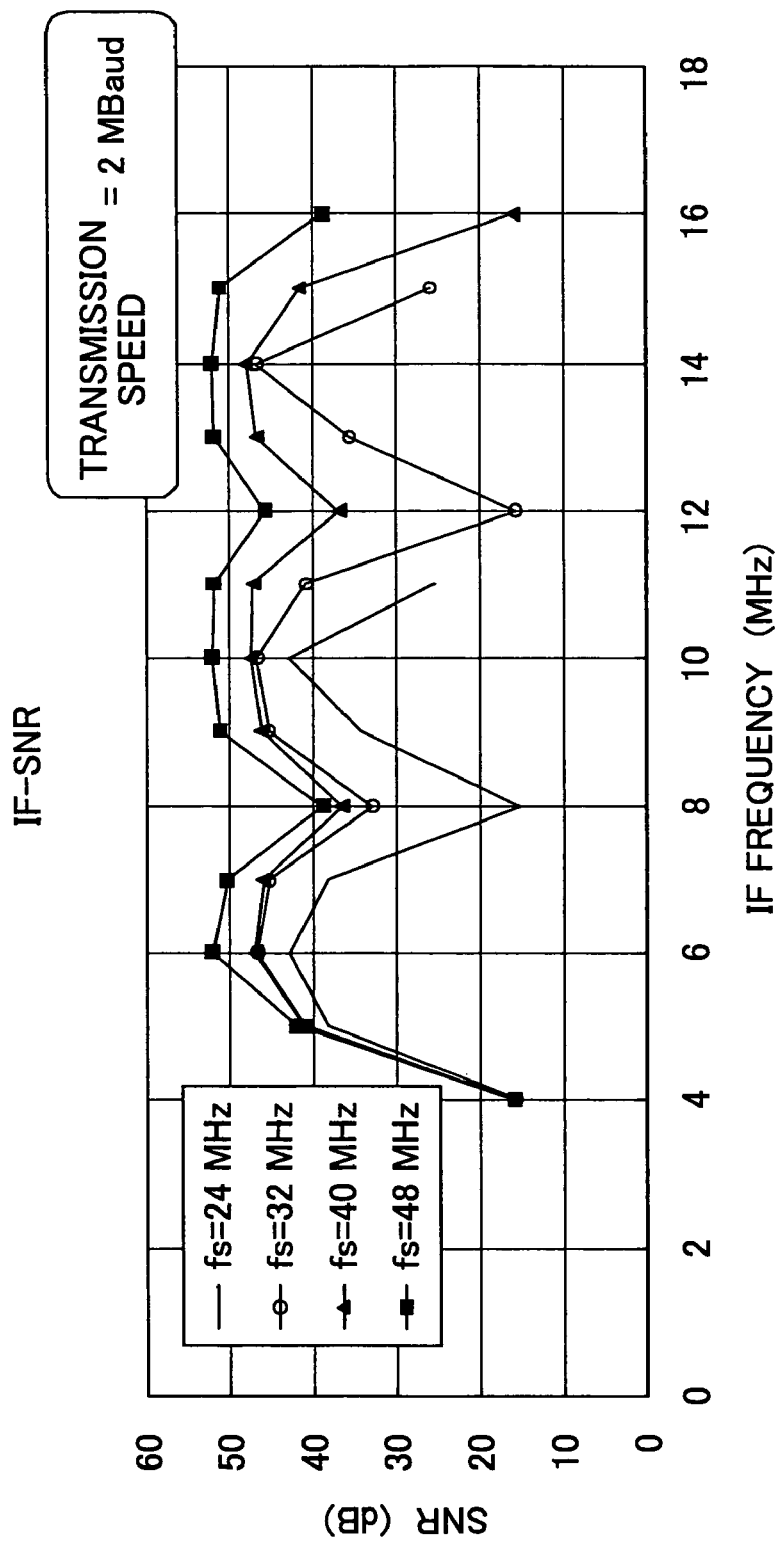
FIG. 9 is a drawing showing SNR characteristics versus the IF frequency with the sampling frequency serving as a parameter in the case of the signal speed being 2 Mbaud.

FIG. 9 is a drawing showing SNR characteristics versus the IF frequency with the sampling frequency serving as a parameter in the case of the signal speed being 2 Mbaud.

As can be seen in FIG. 9, when the signal speed is sufficiently smaller than the channel interval, the SNR versus the IF frequency has a characteristic curve having repeating peaks and bottoms, with its peaks being almost independent of the sampling frequency fs. In the example of FIG. 9, the peaks are positioned at 6 MHz, 10 MHz, and 14 MHz regardless of whether the sampling frequency fs is 48 MHz, 40 MHz, 32 MHz, or 24 MHz.

With the signal speed being denoted as SR, the channel interval denoted as fspace, and the sampling frequency of the A/D converter denoted as fs, the IF signal frequency required for optimizing the SNR is obtained as follows.

In the case of SR≦fspace/2, $$IF1 = (fspace + fspace + fspace/2)/2 \pm (fspace/2) \times N \quad (3)$$
$$= 5 \times fspace/4 \pm (fspace/2) \times N$$

In the case of SR≦fspace/2, $$IF2 = IF1 + (SR - fspace/2)/2 \quad (4)$$

Here, N is an integer.

As previously described, the sampling frequency fs of the A/D converter 51 is generally fixed. The controller 60 may thus set the base frequency of the local frequency generated by the VCO 47 such that the IF signal frequency is set to fs/4 as a default as shown in the above equation (2). Then, the IF signal frequency responsive to the channel interval and the signal speed is derived by using the equation (3) or the equation (4), depending on the relative size of the channel interval and the signal speed. Control is then performed such as to make the base frequency reflect a difference between the derived IF signal frequency and the default IF signal frequency. Namely, such difference is converted into a voltage, which is then supplied as a change in the reference voltage of the VCO 47.

In this case, the controller 60 may perform the computation of the above equations and perform the control operations based on software-based processing. Alternatively, provision may be made such that the controller 60 holds correspondences between predetermined parameters and control signals as a table stored in memory, and refers to this table to perform the control operations.

Figure 10:
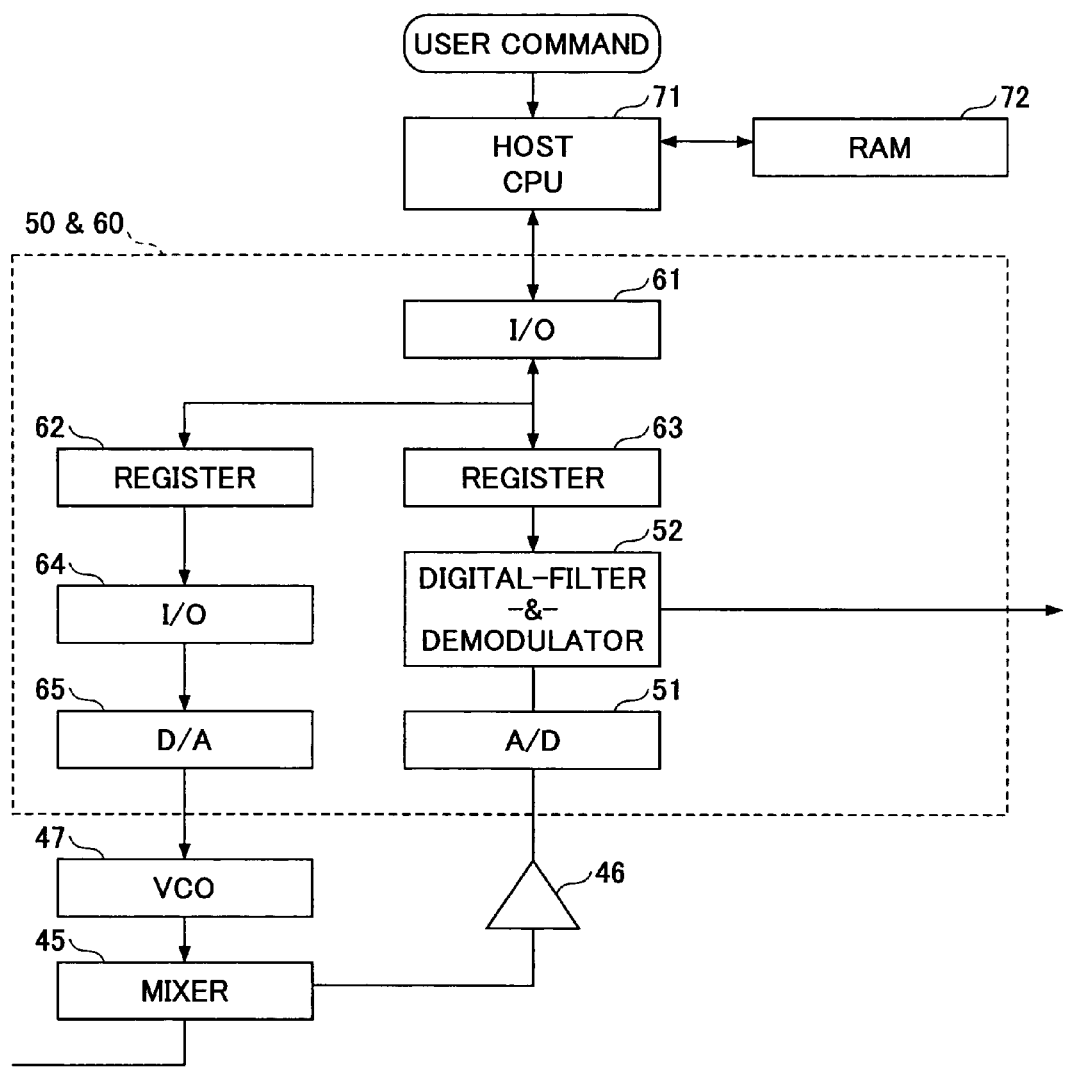
FIG. 10 is a drawing showing an example of the configuration of a demodulation unit and a controller.

FIG. 10 is a drawing showing an example of the configuration of the demodulation unit 50 and the controller 60. In the configuration shown in FIG. 10, the demodulation unit 50 and the controller 60 are implemented as a single chip, and a CPU 71 serving as the master of control operation and a RAM 72 for storing a table are provided separately from the chip. From the functional point of view, however, the entire configuration for performing the control operation, including the CPU 71 and the RAM 72 for storing a table, may properly be regarded as the controller 60.

The chip that implements the demodulation unit 50 and the controller 60 includes an I/O 61, a register 62, a register 63, an I/O 64, a D/A 65, the A/D converter 51, and the digital-filter-&-demodulator 52 . The portion comprised of the I/O 61, the register 62, the register 63, the I/O 64, and the D/A 65 correspond to the controller 60, and the A/D converter 51 and the digital-filter-&-demodulator 52 correspond to the demodulation unit 50.

The RAM 72 stores a table in which control codes are defined in correspondence to parameters such as the channel interval and signal speed. The CPU 71 refers to the RAM 72 in response to a user command, thereby acquiring a control code corresponding to the channel interval, signal speed, and the like of the signal received by the receiver apparatus. The CPU 71 writes the acquired control code to the register 62 via the I/O 61. The value of the control code stored in the register 62 is converted into an analog voltage via the I/O 64 and the D/A 65 for provision to the VCO 47. By use of the local frequency generated by the VCO 47, the mixer 45 performs mixing operation. With this provision, it is possible to generate an IF signal frequency responsive to the channel interval, the signal speed, and the like, thereby attaining an optimum SNR.

Further, the CPU 71 writes data indicative of the current symbol rate to the register 63 via the I/O 61. The digital-filter-&-demodulator 52 performs predetermined demodulation according to the current symbol rate based on the content of the register 63.

FIG. 11 is a drawing showing an example of a table in which the control codes are defined in correspondence to the channel interval and the signal speed. This table is stored in the RAM 72 shown in FIG. 10.

The table shown in FIG. 11 stores channel intervals, signal speeds SR, optimum intermediate frequencies IF, a difference of the optimum intermediate frequency IF from 10 MHz that is set as an IF default value as an example, and corresponding control codes, which are associated with each other. If the channel interval is 8 MHz and the signal speed SR is 2.0 Mbaud, for example, the optimum IF is 10 MHz, with a difference from the default value being zero, and the control code being "00000000". If the channel interval is 8 MHz and the signal speed SR is 6.9 Mbaud, the optimum IF is 11.45 MHz, with a difference from the default value being 1.45, and the control code being "00001000". The optimum IF values may be obtained in advance based on computations using the previously described equations, experiments conducted under various conditions, simulations, or the like.

FIG. 12 is a drawing showing a table that shows correspondence between each channel and local frequency. This table is stored in the RAM 72 shown in FIG. 10.

The table of FIG. 12 illustrates channels 18 through 20 as examples. The local frequencies that are required to achieve an IF signal frequency of 10 MHz with respect to the respective channels are stored in correspondence to these channels. In the case of channel 18, for example, an IF signal frequency of 10 MHz can be obtained by using a local frequency of 496 MHz. The corresponding code "0000010000", when written to the register 62 shown in FIG. 10, serves to cause the VCO 47 to generate a local frequency of 496 MHz.

Computation is performed based on the code C1 of the table of FIG. 11 and the code C2 of the table of FIG. 12 to generate a code C3 for attaining an optimum IF. If the channel interval is 8 MHz and the signal speed SR is 6.9 Mbaud, for example, the optimum IF is 11.45 MHz, with a difference from the default value being 1.45, and the control code being "00001000". The code that is necessary to attain a default IF signal frequency of 10 MHz with respect to channel 19 is "0000010010". The control code "00001000" corresponding to the difference (1.45 MHz) from the default IF frequency is combined with (e.g., added to or subtracted from) the code "0000010010" needed to attain the default IF frequency (10 MHz), thereby generating a control code C3 that is necessary to attain a desired IF frequency (11.45 MHz).

FIG. 13 is a drawing showing relationships between the value of a control code to be written to the register 62 of FIG. 10, a VCO voltage, and a local frequency. If the control code C3 obtained from the control codes C1 and C2 as described above is "0000000010", for example, this control code is written to the register 62 of FIG. 10, which results in the VCO voltage supplied from the D/A 65 to the VCO 47 being 0.15 V. In this case, further, the local frequency generated by the VCO 47 becomes 56.03 MHz.

In this manner, the control code C3 for achieving an optimum IF is generated based on the code C1 of the table of FIG. 11 and the code C2 of the table of FIG. 12, and is written to the register 62 of FIG. 10, thereby generating an IF signal frequency that is responsive to parameters such as the channel interval and the signal speed, with an optimum SNR being obtained as a result. These parameters are not limited to the channel interval and the signal speed, but may include the sampling frequency as well.

Further, the present invention is not limited to these embodiments, but various variations and modifications may be made without departing from the scope of the present invention.

What is claimed is:

1. A receiver apparatus, comprising:
   a band-pass filter having a variable frequency band coupled to a node for receiving a received signal including a plurality of channels to output at an output node thereof a limited-band signal made by limiting a frequency band of the received signal to a frequency band of a desired channel;
   a frequency conversion unit coupled to the output node of said band-pass filter to output at an output node thereof an intermediate frequency signal made by converting frequencies of the limited-band signal; and
   a control unit configured to adjust an intermediate frequency of the intermediate frequency signal by controlling said frequency conversion unit in response to a signal speed and a channel frequency interval of the received signal.

2. The receiver apparatus as claimed in claim 1, further comprising:
   an A/D converter coupled to the output node of said frequency conversion unit to output at an output node thereof a digital signal made by A/D-converting the intermediate frequency signal; and
   a digital filter coupled to the output node of said A/D converter to limit a frequency band of the digital signal to the frequency band of the desired channel.

3. The receiver apparatus as claimed in claim 2, wherein no SAW filter is provided between said node for receiving the received signal and a point of input to said A/D converter.

4. The receiver apparatus as claimed in claim 2, wherein said controller is configured to adjust the intermediate frequency of the intermediate frequency signal by controlling said frequency conversion unit in response to a sampling frequency of said A/D converter in addition to the signal speed and channel frequency interval of the received signal.

5. The receiver apparatus as claimed in claim 2, wherein said controller is configured to adjust the intermediate frequency of the intermediate frequency signal by controlling said frequency conversion unit in response to one of the signal speed and channel frequency interval of the received signal such that aliasing noise interfering with the frequency band of the desired channel is minimized at a sampling process performed by said A/D converter.

6. The receiver apparatus as claimed in claim 2, wherein said controller is configured to adjust the intermediate frequency of the intermediate frequency signal such that the intermediate frequency becomes substantially ¼ of a sampling frequency of said AID converter.

7. The receiver apparatus as claimed in claim 1, wherein said band-pass filter is implemented as an LC filter.

8. The receiver apparatus as claimed in claim 1, wherein said frequency conversion unit includes:
   a VCO configured to oscillate with a frequency responsive to an input voltage; and
   a mixer circuit configured to multiply the limited-band signal by an oscillating output of said VCO,
   wherein said control unit controls said frequency conversion unit by controlling the input voltage.

9. The receiver apparatus as claimed in claim 1, further comprising a memory operable to store the signal speed and the channel frequency interval and a control code associated therewith, wherein said controller controls said frequency conversion unit in response to the control code read from said memory.

10. A method of processing a received signal, comprising the steps of:
   producing a limited-band signal made by limiting, to a frequency band of a desired channel, a frequency band of a received signal inclusive of a plurality of channels;
   producing an intermediate frequency signal made by converting frequencies of the limited-band signal;
   producing a digital signal made by A/D-converting the intermediate frequency signal;
   applying digital filtering to the digital signal so as to limit a frequency band of the digital signal to the frequency band of the desired channel; and
   adjusting an intermediate frequency of the intermediate frequency signal in response to a signal speed and a channel frequency interval of the received signal.

* * * * *